US 008874666 B2

(12) United States Patent
Bhogal et al.

(10) Patent No.: US 8,874,666 B2
(45) Date of Patent: Oct. 28, 2014

(54) PUBLISHER-ASSISTED, BROKER-BASED CACHING IN A PUBLISH-SUBSCRIPTION ENVIRONMENT

(75) Inventors: Kulvir S. Bhogal, Pflugerville, TX (US); Martin J. Gale, Hamsphire (GB); Rick A. Hamilton, II, Charlottesville, VA (US); Andrew R. Jones, Round Rock, TX (US); Brian M. O'Connell, RTP, NC (US)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 13/033,005

(22) Filed: Feb. 23, 2011

(65) Prior Publication Data

US 2012/0215859 A1    Aug. 23, 2012

(51) Int. Cl.
*G06F 13/00* (2006.01)
*G06F 9/54* (2006.01)
*H04L 12/18* (2006.01)
*H04L 12/58* (2006.01)

(52) U.S. Cl.
CPC .......... *G06F 9/546* (2013.01); *G06F 2209/547* (2013.01); *H04L 51/066* (2013.01); *H04L 12/1859* (2013.01); *H04L 51/14* (2013.01)
USPC ........... 709/206; 709/246; 709/235; 709/234; 709/232

(58) Field of Classification Search
CPC .............. G06F 9/546; G06F 2209/547; H04L 12/1859; H04L 51/14; H04L 51/066
USPC .......... 709/204–206, 246, 235, 234, 232, 230
See application file for complete search history.

(56) References Cited

U.S. PATENT DOCUMENTS

| | | | |
|---|---|---|---|
| 7,266,826 B2 | 9/2007 | Katiyar et al. | |
| 7,406,537 B2 | 7/2008 | Cullen | |
| 7,437,417 B2 | 10/2008 | Reynolds et al. | |
| 7,519,546 B2 | 4/2009 | Murren et al. | |
| 7,574,500 B2 * | 8/2009 | Roddy | 709/223 |
| 7,587,450 B2 | 9/2009 | Morris | |
| 7,698,372 B2 | 4/2010 | Codignotto | |
| 2003/0115291 A1 | 6/2003 | Kendall et al. | |

(Continued)

OTHER PUBLICATIONS

Maitland, J., "Keeping Control Isn't Easy", Chapter 4: Cloud-Based Infrastructure, SearchCloudComputing.com, 13 pages.

(Continued)

*Primary Examiner* — Kenneth Coulter
(74) *Attorney, Agent, or Firm* — William E. Schiesser; Keohane & D'Alessandro, PLLC

(57) ABSTRACT

An approach for a publisher-assisted, broker-based cache that can be utilized to reduce a volume of data delivered between a publisher and broker is provided. Specifically, when a message is being generated on a publisher system, the publisher system will determine if the message includes a set of data that has a potential to be repeated in subsequent messages. An identified set of data will be associated/marked/tagged with a unique identifier corresponding thereto. The modified message will be sent to a broker system, which will detect/locate the unique identifier, cache the corresponding data, and send the message along to any applicable subscriber systems. When a subsequent message that is supposed to contain the cached set of data is generated, the publisher system will substitute the unique identifier for the set of data to yield an abbreviated message and send the abbreviated message to the broker system.

13 Claims, 6 Drawing Sheets

(56) References Cited

U.S. PATENT DOCUMENTS

| | | |
|---|---|---|
| 2006/0047666 A1 | 3/2006 | Bedi et al. |
| 2006/0146999 A1 | 7/2006 | Thompson et al. |
| 2006/0149840 A1 | 7/2006 | Thompson et al. |
| 2006/0167897 A1 | 7/2006 | Jones et al. |
| 2006/0168331 A1 | 7/2006 | Thompson et al. |
| 2006/0184656 A1* | 8/2006 | Roddy .......................... 709/223 |
| 2007/0043824 A1* | 2/2007 | Fremantle ..................... 709/214 |
| 2009/0228563 A1 | 9/2009 | Jones et al. |

OTHER PUBLICATIONS

Mell et al., "The NIST Definition of Cloud Computing", National Institute of Standards and Technology, Information Technology Laboratory, Version 15, Oct. 7, 2009, 2 pages.

* cited by examiner

US 8,874,666 B2

PUBLISHER-ASSISTED, BROKER-BASED CACHING IN A PUBLISH-SUBSCRIPTION ENVIRONMENT

TECHNICAL FIELD

The present invention relates to publish-subscription (pub/sub) environments. Specifically, the present invention relates to an approach for caching potentially repetitive data in a pub/sub environment.

BACKGROUND

Publish-subscription (pub/sub) messaging patterns are communication models used in many different industries today. For example, pub/sub is used in banking systems, weather systems, and other systems that require techniques to notify multiple entities of common information. In general, pub/sub is a messaging paradigm where senders (publishers) of messages typically are not programmed to send their messages to specific receivers (subscribers). Rather, published messages can be characterized into classes, without knowledge of what (if any) subscribers there may be. Subscribers express interest in one or more classes and can receive messages that are of interest, without knowledge of what publishers there are. This decoupling of publishers and subscribers can allow for greater scalability and a more dynamic network topology.

One deficiency in pub/sub models is that all of the content (i.e., the body/payload of the message) is sent to all users, and thus the amount of network traffic generated from the publisher is, in the simplest form, the size of the message multiplied by the number of subscribers. Moreover, it can be common for the same set of data to be re-sent multiple times (in different messages) to the same subscriber(s). As such, the volume of the data generated can be large and consume a great deal of network bandwidth.

SUMMARY

In general, embodiments of the present invention provide an approach for a publisher-assisted, broker-based cache that can be utilized to reduce a volume of data (e.g., network traffic) delivered between a publisher and broker in a publication/subscription (pub/sub) environment. Specifically, in a typical embodiment, when a message is being generated on a publisher system, the publisher system will determine if the message includes a set of data that has a potential to be repeated in subsequent messages. Such data can be determined from historical messages (e.g., determining that a certain set of data appeared in multiple messages and is thus flagged in a database or the like), a set of rules (e.g., if data set "Y" appears, flag it as potentially repetitive), etc. Regardless, once such a set of data has been identified, the set of data will be associated/marked/tagged (e.g., in the message) with a unique identifier/cache key corresponding thereto (i.e., to yield a modified message). The modified message will be sent to a broker system, which will detect/locate the unique identifier, cache the corresponding data, and send the message along to any applicable subscriber systems. When a subsequent message that is supposed to contain the cached set of data is generated, the publisher system will instead substitute the unique identifier for the set of data to yield an abbreviated message and send the abbreviated message to the broker system. Upon receipt, the broker system will detect/locate the unique identifier, retrieve the corresponding set of data from the cache, replace the unique identifier with the set of data to yield a completed message, and then send the completed message to the applicable subscriber systems.

It is noted that alternatively the set of data could be cached on the subscriber system (e.g., instead of or in addition to being cached by the broker system). In this case, the abbreviated message would be received by the subscriber systems. This would allow the broker system to continue to use the cache data with the downstream subscribers when sending the publications.

A first aspect of the present invention provides a method for caching potentially repetitive message data in a publish-subscription (pub/sub) messaging environment, comprising: identifying, on a publisher system, a set of data in a first message having a potential to appear in at least one future message; associating the set of data with a unique identifier; sending the first message to a broker system; locating the unique identifier in the first message; and storing the set of data associated with the unique identifier in a cache.

A second aspect of the present invention provides a system for caching potentially repetitive message data in a publish-subscription (pub/sub) messaging environment, comprising: at least one bus; at least one processor coupled to the at least one bus; and at least one memory medium coupled to the at least one bus, the at least one memory medium comprising instructions to: identify, on a publisher system, a set of data in a first message having a potential to appear in at least one future message; associate the set of data with a unique identifier; send the first message to a broker system; locate the unique identifier in the first message; and store the set of data associated with the unique identifier in a cache.

A third aspect of the present invention provides at least one computer program product for caching potentially repetitive message data in a publish-subscription (pub/sub) messaging environment, the at least one computer program product comprising at least one computer readable storage media, and program instructions stored on the at least one computer readable storage media, to: identify, on a publisher system, a set of data in a first message having a potential to appear in at least one future message; associate the set of data with a unique identifier; send the first message to a broker system; locate the unique identifier in the first message; and store the set of data associated with the unique identifier in a cache.

A fourth aspect of the present invention provides a method for deploying a system for caching potentially repetitive message data in a publish-subscription (pub/sub) messaging environment, comprising: deploying a computer infrastructure being operable to: identify, on a publisher system, a set of data in a first message having a potential to appear in at least one future message; associate the set of data with a unique identifier; send the first message to a broker system; locate the unique identifier in the first message; and store the set of data associated with the unique identifier in a cache.

BRIEF DESCRIPTION OF THE DRAWINGS

These and other features of this invention will be more readily understood from the following detailed description of the various aspects of the invention taken in conjunction with the accompanying drawings in which.

Figure 1:
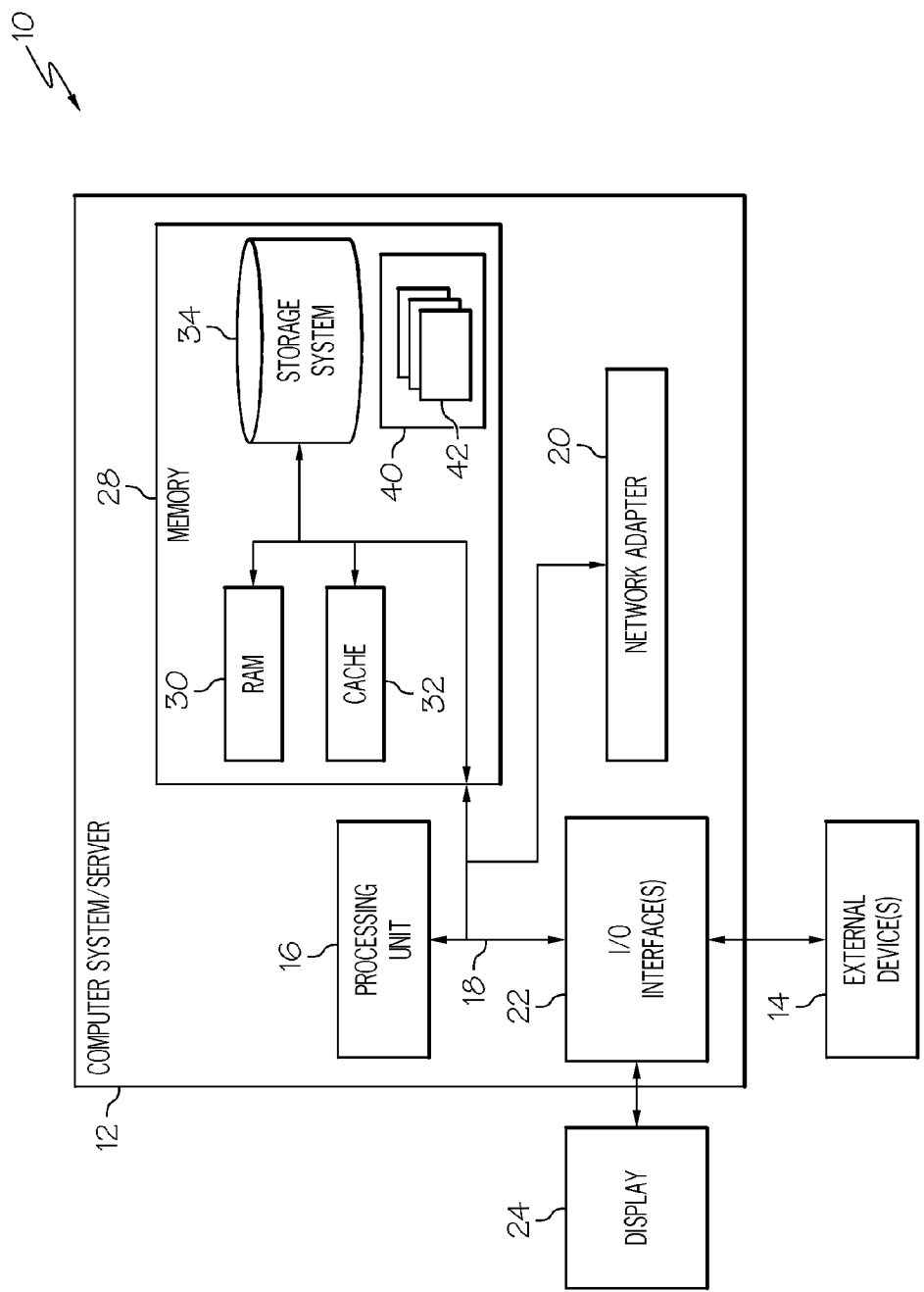
FIG. 1 depicts a computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments now will be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

In general, embodiments of the present invention provide an approach for a publisher-assisted, broker-based cache that can be utilized to reduce a volume of data (e.g., network traffic) delivered between a publisher and broker in a publication/subscription (pub/sub) environment. Specifically, in a typical embodiment, when a message is being generated on a publisher system, the publisher system will determine if the message includes a set of data that has a potential to be repeated in subsequent messages. Such data can be determined from historical messages (e.g., determining that a certain set of data appeared in multiple messages and is thus flagged in a database or the like), a set of rules (e.g., if data set "Y" appears, flag it as potentially repetitive), etc. Regardless, once such a set of data has been identified, the set of data will be associated/marked/tagged (e.g., in the message) with a unique identifier/cache key corresponding thereto (i.e., to yield) a modified message). The modified message will be sent to a broker system, which will detect/locate the unique identifier, cache the corresponding data, and send the message along to any applicable subscriber systems. When a subsequent message that is supposed to contain the cached set of data is generated, the publisher system will instead substitute the unique identifier for the set of data to yield an abbreviated message and send the abbreviated message to the broker system. Upon receipt, the broker system will detect/locate the unique identifier, retrieve the corresponding set of data from the cache, replace the unique identifier with the set of data to yield a completed message, and then send the completed message to the applicable subscriber systems.

It is noted that alternatively the set of data could be cached on the subscriber system (e.g., instead of or in addition to being cached by the broker system). In this case, the abbreviated message would be received by the subscriber systems. This would allow the broker system to continue to used the cache data to the downstream subscribers when sending the publications.

Referring now to FIG. 1, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. In general, program/utility 40 performs the function of the present invention as described herein. Each of the operating systems, one or more application programs, other program modules, and program data or some combination thereof, may include an implementation of a networking environment. Program modules 42 generally carry out the functions and/or methodologies of embodiments of the invention as described herein. Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22.

Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Embodiments of the present invention provide an approach for a publisher-based cache that can be utilized to reduce the volume of data (network traffic) delivered to individual subscribers in a pub/sub system.

Figure 2:
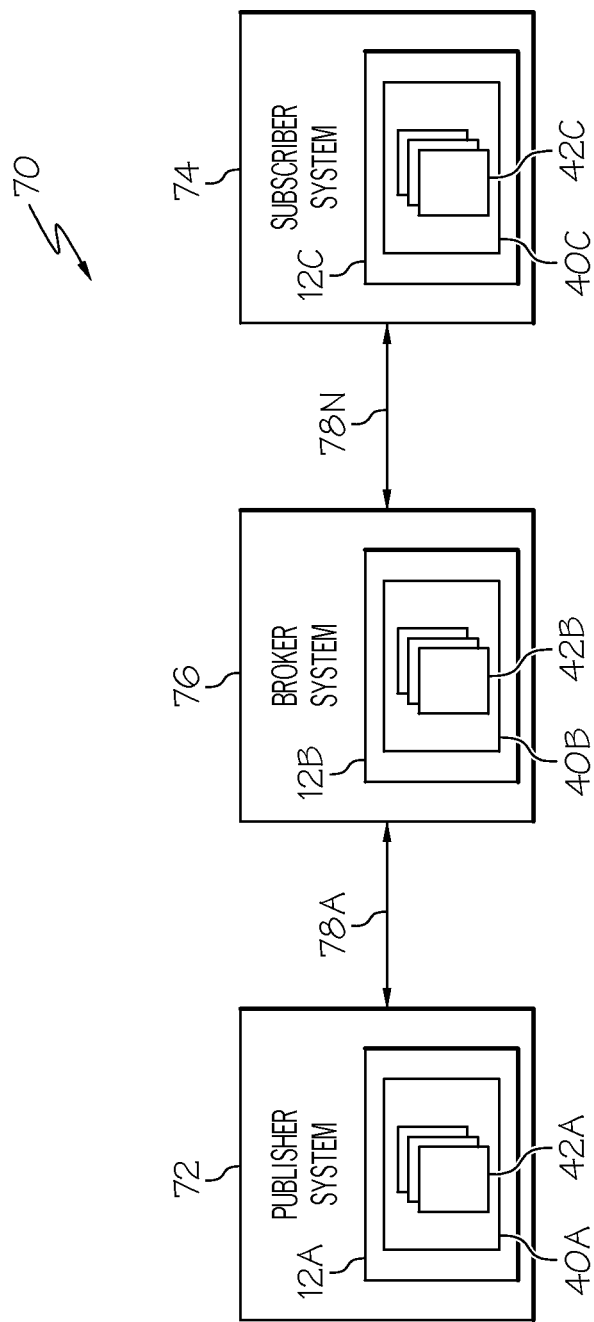
FIG. 2 depicts a pub/sub environment according to an embodiment of the present invention.

Referring now to FIG. 2, a pub/sub environment 70 in accordance with at least one embodiment of the present invention is shown in greater detail. As depicted, environment 70 comprises a publisher system 72 (also referred to below as "publisher") in communication with a subscriber system 74 (also referred to below as "subscriber") via a broker system 76 (also referred to below as "broker"). Systems 72, 74, and 76 communicate via network links 78A-N, which can represent any type of network links and/or communication networks now known or later developed. It is understood that publisher system 72, subscriber system 74, and broker system 76 each comprise one or more computer systems 12A-C (e.g., which comprises components/elements similar to computer system 12 of FIG. 1). As such, publisher system 72, subscriber system 74, and broker system 76 can each comprise a program/utility 40A-C that enable corresponding functions thereof. Specifically, publisher system 72 comprises publisher program 40A having a set (at least one) of publisher program modules 42A, broker system 76 comprises broker program 40B having a set of broker program modules 42B, and subscriber system 74 comprises a subscriber program 40C having a set of subscriber program modules 42C. Program modules 42A-C of programs 40A-C typically enable/perform the functions that will be described below in conjunction with FIGS. 3-5.

Figure 3:
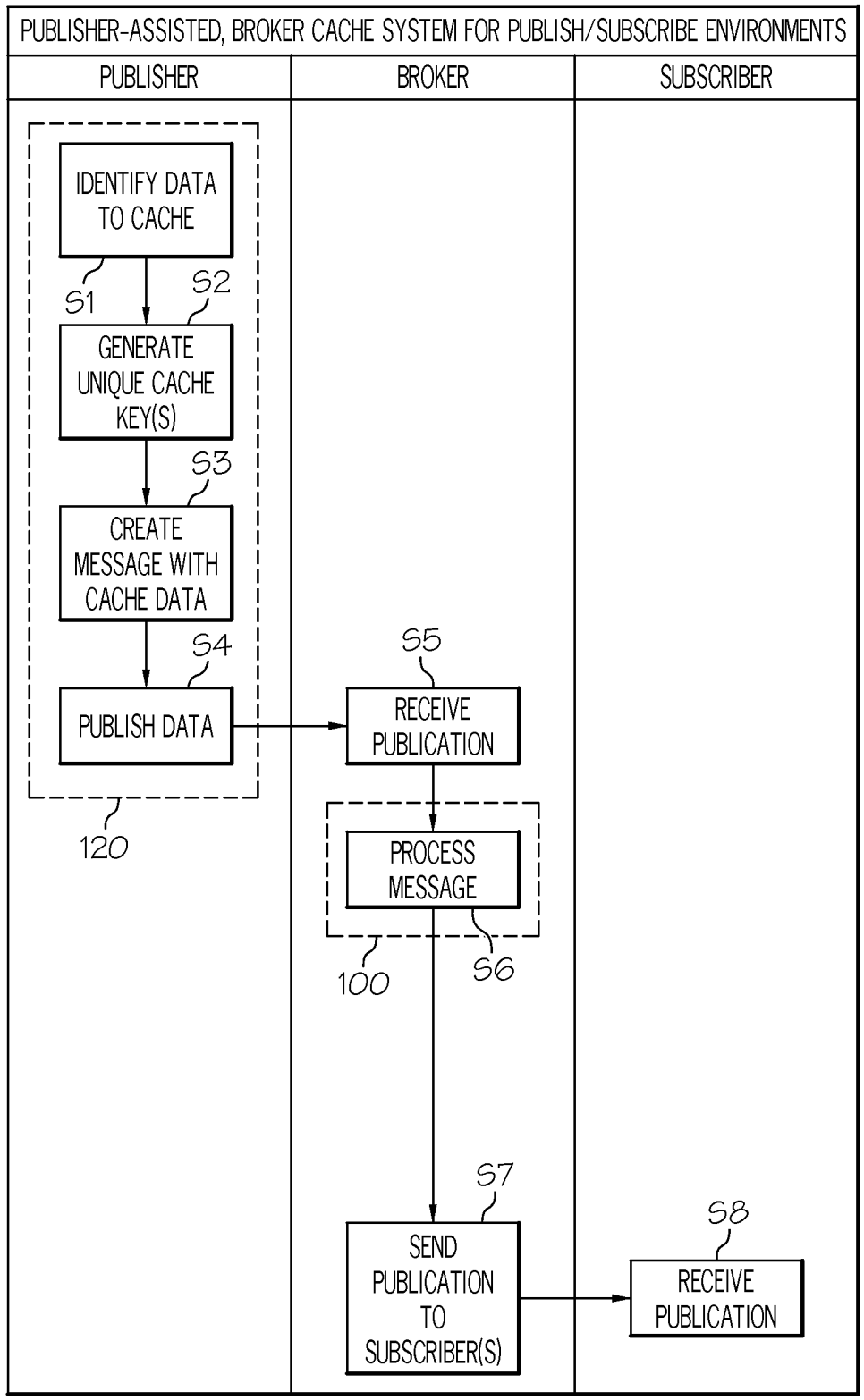
FIG. 3 depicts a component flow diagram according to an embodiment of the present invention.

Referring now to FIG. 3, a component flow diagram illustrating the process involved with a publisher-assisted, broker-based cache approach for a publish/subscribe system is shown in greater detail. In general, the process utilized publisher cache engine 120 and typically begins with the publisher system generating a message for publication to subscriber system(s). Specifically, when generating the message, in step S1 the publisher system will first identify a set of data (hereinafter "data") that is likely to be repeated in one or more messages that will be sent to brokers for publication. This type of data is considered cacheable under at least one embodiment of the present invention. Along these lines, the identification process can be configured with attributes such as one or more of the following:

If data is going to be in more than "n" number of messages;
If data is going to be in more than "m" number of messages and is over "x" number of bytes.
These determinations can be made based upon historical information of messages already published or about the types of data typically published (e.g. common extensible markup language (XML) schemas that are known to be published may have common, lengthy tags or sequences of tags that can be cached).

In step S2, once the cacheable data is identified, a cache key/unique identifier is generated. Then, in step S3, the cacheable data is tagged/annotated/associated with the unique identifier within the message body during message creation. This process could be implemented using one of the methods described in the sections below entitled: Potential Implementations I and II. In step S4, the publisher system sends the message to the broker system which receives it in step S5. As will be further described below in conjunction with FIG. 4, broker cache engine 100 then process the message in step S6, which can involve detecting the unique identifiers, locating the set of data to be cached, caching the data, and optionally removing the unique identifier. In step S7, the message (with or without the unique identifier) will be sent to the applicable subscriber system(s) which will receive it in step S8.

Although not shown, the subscriber can have access to the broker system cache and/or maintain its own cache. This allows the subscriber to maintain or have access to previously cached data. Regardless, when the publisher is creating a message with previously cached data, the publisher system will substitute the unique identifier for such data to yield an abbreviated message, and then send the abbreviated message to the broker system. Upon receipt, the broker system can then locate the unique identifier in the abbreviated message, retrieve the associated data from the cache, replace the unique identifier in the message with the retrieved data, and then send the completed message to the applicable subscriber system(s). Alternatively, in the event the subscriber system(s) maintain or have access to the cached data, the abbreviated message received by the broker system from the publisher system can be sent to the subscriber system(s), which can retrieve the previously cached data that can be used by the subscriber system(s) to complete the message (e.g., via a subscriber cache engine).

Figure 4:
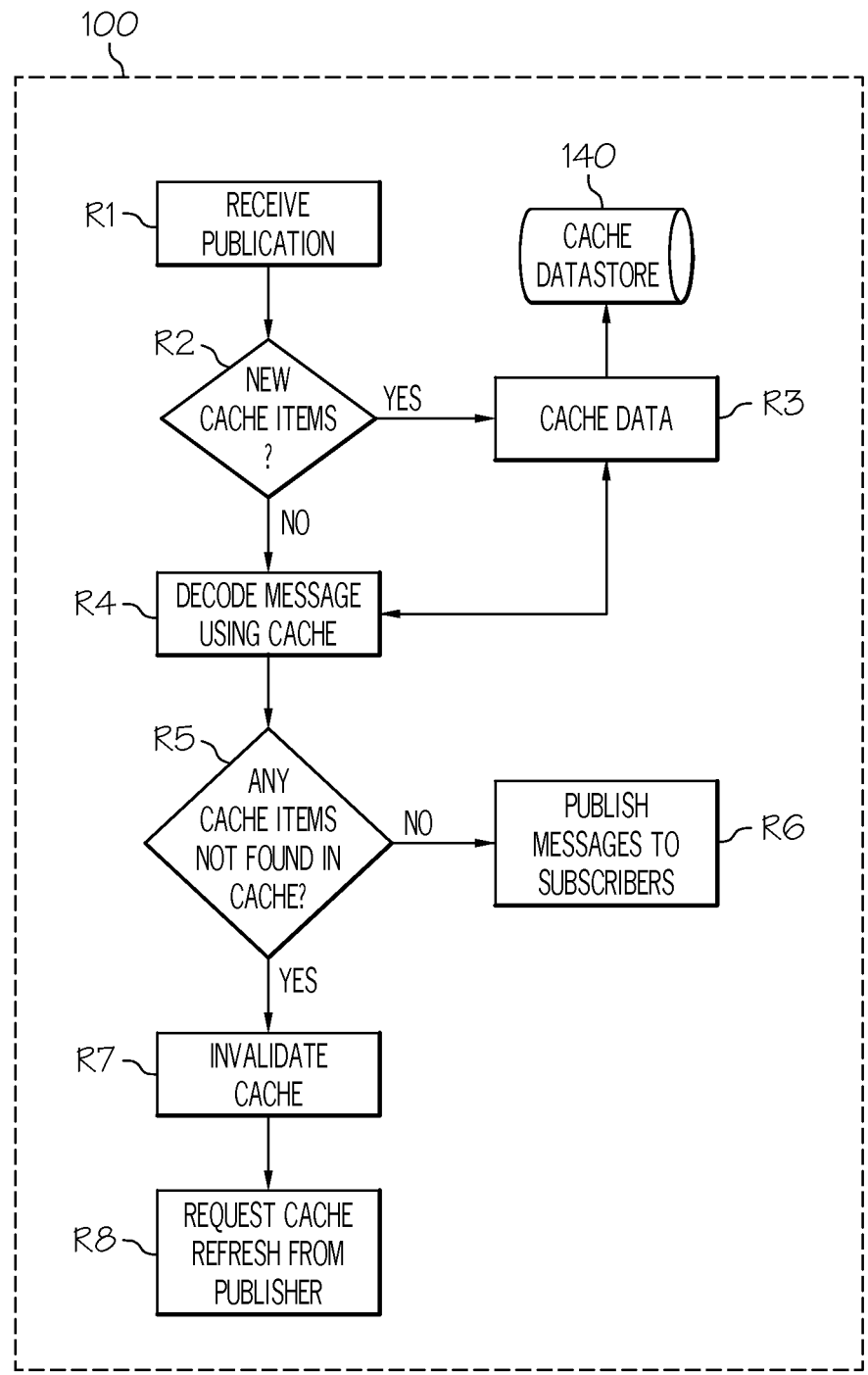
FIG. 4 depicts another component flow diagram according to an embodiment of the present invention.

Referring now to FIG. 4, the functions of broker cache engine 100 will be described in greater detail. In step R1, a message/publication is received from the publisher system. In step R2, it is determined whether new items need to be cached. If so, they are stored in data store/cache 140 in step R3. Once all cacheable data items have been so stored, the message is analyzed to see if it includes unique identifier(s) corresponding to data cached from previous messages (e.g., the message is an abbreviated message) in step R4. If so, that data is retrieved from cache 140 and inserted into the message. Once all new cacheable data has been cached, and previously cached data has been retrieved, it is determined in step R5 whether or not the message included cache keys/unique identifiers (pertaining to previously cached data) that were not valid (e.g., the cache keys/unique identifiers did not appear to be associated with any data stored in cache 140). If so, the cache can be invalidated in step R7, and a refresh of cache 140 can be requested from the publisher system in step R8. Regardless, once any broker-side processing is complete, the message can be sent to the subscriber system(s) in step R6. As indicated above, the subscriber system(s) can receive either a completed message (e.g., based on step R4) or an abbreviated message in the event the subscriber system(s) have access to previously cached data as indicated above.

It is understood that it may be beneficial to allow a broker system to invalidate cache items on a publisher system and/or a subscriber system. If, for example, the broker's cache engine can determine that data previously cached is never used again, or has a very low likelihood of being used again, it may send an invalidation message upon the next publish to the other system(s). This may be implemented as a custom header that contains the key and an invalidate directive. The subscriber system and/or publisher system, upon receiving and reading the message, will simply remove the cached item from its cache.

Additional aspects of the system:
   The cache 140 (FIG. 4) illustrated above can be either in-memory or an on-disk data store (e.g. database like DB2, flat file, binary file, binary encrypted file, etc).
   The broker system's cache engine 100 may attach an expiration for each key. This value could be used by the subscriber system's or publisher system's caches to invalidate cache entries. This may be useful to limit the growth of the cache.
   The broker system could send a subsequent message (to both publisher systems and subscriber systems) that would invalidate certain cache entries (e.g. it determines that data will never be used again).
   The broker system's cache engine 100 can support automatic cache creation as described earlier. For example, if the last N number of messages on a topic contains a common data segment, then that data segment should be marked for caching and a cache key/data pair created and sent with the next message.

Illustrative Implementations
Illustrative Implementation I

The cache engine either deletes or substitutes the cached data with the appropriate cache key/unique identifier (the system that allows for the data to be deleted is described below). For example, assume that the message being sent appears as follows:
   AAAAAABBBBBBBCCCCCCDDDDDDEEEEEE The cache engine states that the "B's" will likely be used in future messages and instructs recipients that they should retain that portion in their local cache. In this example, the portion of data BBBBBBB will be referred to as ~rp1. The recipient will store the portion BBBBBBB and analyze incoming messages for the presence of ~rp1. Further assume that at some future point in time, a publisher wants to send a message that appears as follows:
   FFFFFFFFBBBBBBBUUUUUUJJJJJJJJ
Rather than sending this message, it can now send the following:
   FFFFFFFF~rp1UUUUUUJJJJJJJJ This allows for the sender to send less traffic on the network. Upon receipt of this message, the recipient will then reconstruct the message based on translation information from its cache and create the following message:
   FFFFFFFFBBBBBBBUUUUUUJJJJJJJJ
after expanding ~rp1 to BBBBBBB.

Illustrative Implementation II

If it was desired for cached data to be inserted at the 12th position of the message, the message and a property/attribute (or custom header) would be generated that indicates rp1=12, x,y (where rp1 is the cache key/unique identifier, and 12 is the first position to insert the data, x is the next, y is the next, and so on). This method obviates the need to delete any un-cached message data that matches a cache indicator.

Under embodiments of the present invention, multiple approaches may be included in these solutions. Specifically, several techniques may be implemented to identify cacheable information. The techniques identified below may be used independently or in conjunction with each other.

Differencing Engine: This approach analyzes messages either within a single topic, or across multiple topics capturing the similarities between messages. The most similar aspects of the messages are good candidates for future caching. The similarities captured may be persisted across restarts such that caching efficiency is not interrupted. The items cached may change over time as the message profiles change. For example if one type of message is dominant for a period of time, then a second disparate message type is dominant, cache entries related to the first type may be invalidated to make room for the second type.

Rate Based Selection: It may be common for some messages and topics to have a higher rate of publishing than others. This rate may be related to the importance or the dynamic nature of the subject for each particular topic. Topics with a higher publication rates should be selected for caching before topics with a lower publication rate. Rate based selection counts the total number of messages per topic, or message types within a single topic, and selects the most published topics or message types for message portion caching.

Message Correlation Selection: The system may discern correlations between related topics and therefore cache the potential similarities for the related topics upon detection of the first message. For example, there may be related topics of /scores/[court]/ and /stats/[court] where court is a changing topic related to particular players on a particular cart. Every message published to a /stats/[court] is preceded by a message published to /scores/[court]. Both sets of messages may identify the player names for that particular court. Therefore, this method may discern that for every message published to /scores/[court] and /stats/[court] that while components of the message change (current score, current stats) the player names stay the same. Therefore, for a short period of time after a message is published to /scores/[court] the player name component is eligible for caching until the corresponding /stats/[court] message is sent.

Finally, it is noted that different methods of signifying data entities may be used by both senders and recipients of data. These methods include universal hashing, hashing with checksums, rolling hashes, or even cryptographic hash functions, should security dictate. Each of these approaches offers certain advantages and can be used to speed and ease the implementation of any concepts described in this disclosure.

Figure 5:
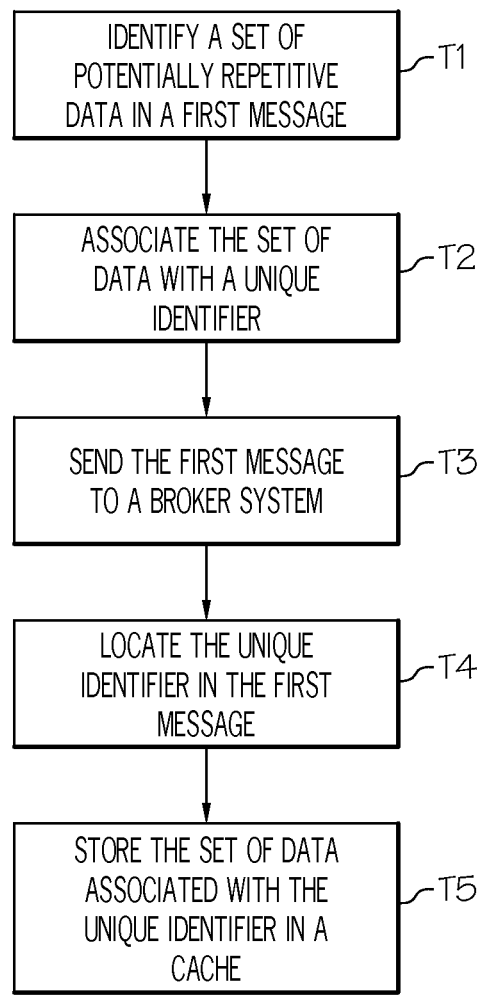
FIG. 5 depicts a method flow diagram according to an embodiment of the present invention.

Referring now to FIG. 5, a method flow diagram according to an embodiment of the present invention is shown. In step T1, a set of data in a first message received having a potential to appear in at least one future message (i.e., potentially repetitive data) is identified. In step T2, the set of data is associated with a cache key/unique identifier. In step T3, the first message is sent to a broker system. In step T4, the unique identifier is located in the first message on the broker system. In step T5, the set of data associated with the unique identifier is stored in a cache (e.g., a broker system-accessible cache, a subscriber system-accessible cache, etc.).

Figure 6:
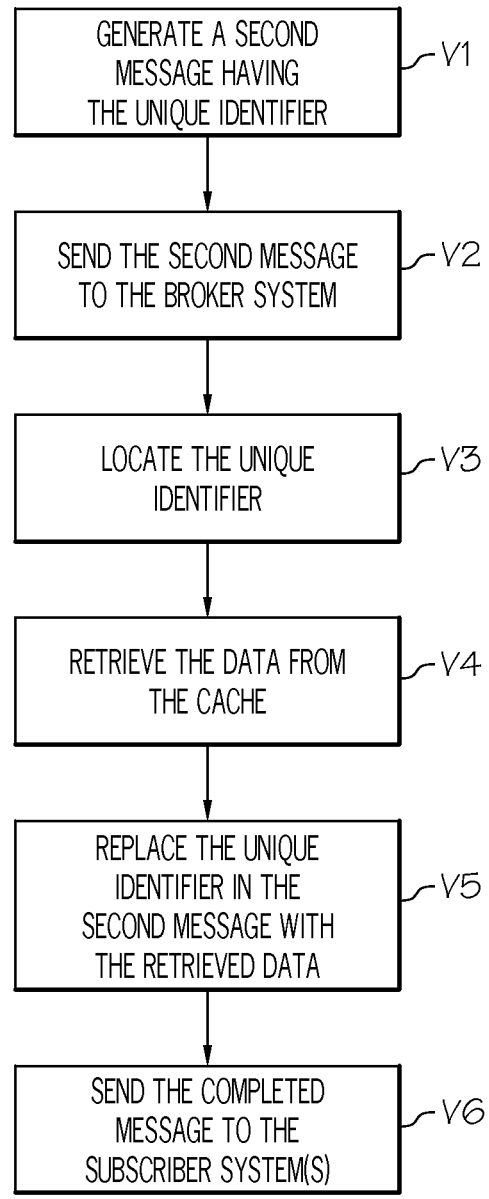
FIG. 6 depicts a method flow diagram according to an embodiment of the present invention.

Referring now to FIG. 6, the retrieval of previously cached data will be described in greater detail. In step V1, a second message is generated on the publisher system. In this instance, the second message will have the unique identifier in place of a set of data that was previously cached. In step V2, the second message is sent to the broker system as an abbreviated message. In step V3, the unique identifier is located in the second message. In step V4, the set of data is retrieved from the cache, and used to replace the unique identifier in the second message in step V5. Then, in step V6, the second message is sent from the broker system to a set of subscriber systems. Alternatively, the abbreviated message received by the broker system could be sent to the subscriber system(s) which the subscriber system(s) could then utilize to retrieve the data from cache to complete the message. This option would occur where the subscriber system(s) have access to previously cached data.

While shown and described herein as data caching solution, it is understood that the invention further provides various alternative embodiments. For example, in one embodiment, the invention provides a computer-readable/useable medium that includes computer program code to enable a computer infrastructure to provide data caching functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide data caching functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for providing data caching functionality. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for caching potentially repetitive message data in a publish-subscription (pub/sub) messaging environment, comprising:
   identifying, on a publisher system, a set of data in a first message, the set of data scheduled to appear in a number of future messages above a predetermined threshold;
   associating the set of data with a unique identifier;
   sending the first message to a broker system;
   locating the unique identifier in the first message;
   storing the set of data associated with the unique identifier in a cache, the cache located in a set of subscriber systems;
   generating a second message on the publisher system, the second message having the unique identifier in place of the set of data;
   sending the second message to each of a plurality of subscribers through the broker system;

locating, by each of the plurality of subscriber systems, the unique identifier in the second message;

retrieving, by the each of the plurality of subscriber systems, the set of data from the cache; and replacing, by the each of the plurality of subscriber systems, the unique identifier in the second message with the set of data.

2. The method of claim 1, further comprising:

removing the unique identifier from the first message; and sending the first message from the broker system to the set of subscriber systems.

3. The method of claim 1, further comprising:

receiving an invalidation message from the publisher system; and removing a set of items from the cache based on the invalidation message.

4. The method of claim 1, the potential being indentified based on at least one of the following factors: a quantity of the at least one future message that will include the set of data, and a size of the at least one future message.

5. A system for caching potentially repetitive message data in a publish-subscription (pub/sub) messaging environment, comprising:

at least one bus;

at least one processor coupled to the at least one bus; and at least one memory medium coupled to the at least one bus, the at least one memory medium comprising instructions to:

identify, on a publisher system, a set of data in a first message, the set of data scheduled to appear in a number of future messages above a predetermined threshold;

associate the set of data with a unique identifier;

send the first message to a broker system;

locate the unique identifier in the first message;

store the set of data associated with the unique identifier in a cache associated with a set of subscriber systems;

generate a second message on the publisher system, the second message having the unique identifier in place of the set of data;

send the second message to each of a plurality of subscribers through the broker system;

locate, by each of the plurality of subscriber systems, the unique identifier in the second message;

retrieve, by the each of the plurality of subscriber systems, the set of data from the cache; and replace, by the each of the plurality of subscriber systems, the unique identifier in the second message with the set of data.

6. The system of claim 5, the at least one memory medium further comprising instructions to:

remove the unique identifier from the first message; and send the first message from the broker system to the set of subscriber systems.

7. The system of claim 5, the at least one memory medium further comprising instructions to:

receive an invalidation message from the publisher system; and remove a set of items from the cache based on the invalidation message.

8. The system of claim 5, the potential being indentified based on at least one of the following factors: a quantity of the at least one future message that will include the set of data, and a size of the at least one future message.

9. At least one computer program product for caching potentially repetitive message data in a publish-subscription (pub/sub) messaging environment, the at least one computer program product comprising at least one non-transitory computer readable storage medium, and program instructions stored on the at least one non-transitory computer readable storage media, to:

identify, on a publisher system, a set of data in a first message, the set of data scheduled to appear in a number of future messages above a predetermined threshold;

associate the set of data with a unique identifier;

send the first message to a broker system;

locate the unique identifier in the first message; store the set of data associated with the unique identifier in a cache of a set of subscriber systems;

generate a second message on the publisher system, the second message having the unique identifier in place of the set of data;

send the second message to each of a plurality of subscribers through the broker system;

locate, by each of the plurality of subscriber systems, the unique identifier in the second message;

retrieve, by the each of the plurality of subscriber systems, the set of data from the cache; and replace, by the each of the plurality of subscriber systems, the unique identifier in the second message with the set of data.

10. The at least one computer program product of claim 9, further comprising program instructions stored on the at least one non-transitory computer readable storage medium to:

remove the unique identifier from the first message; and send the first message from the broker system to the set of subscriber systems.

11. The at least one computer program product of claim 9, further comprising program instructions stored on the at least one non-transitory computer readable storage medium to:

receive an invalidation message from the publisher system; and remove a set of items from the cache based on the invalidation message.

12. The at least one computer program product of claim 9, the potential being indentified based on at least one of the following factors: a quantity of the at least one future message that will include the set of data and a size of the at least one future message.

13. A method for deploying a system for caching potentially repetitive message data in a publish-subscription (pub/sub) messaging environment, comprising:

deploying a computer infrastructure being operable to:

identify, on a publisher system, a set of data in a first message, the set of data scheduled to appear in a number of future messages above a predetermined threshold;

associate the set of data with a unique identifier;

send the first message to a broker system;

locate the unique identifier in the first message;

store the set of data associated with the unique identifier in a subscriber system cache;

generate a second message on the publisher system, the second message having the unique identifier in place of the set of data;

send the second message to each of a plurality of subscribers through the broker system;

locate, by each of the plurality of subscriber systems, the unique identifier in the second message;

retrieve, by the each of the plurality of subscriber systems, the set of data from the cache; and replace, by the each of the plurality of subscriber systems, the unique identifier in the second message with the set of data.

\* \* \* \* \*